J. N. STEWART.
Wagons.
No. 134,445. Patented Dec. 31, 1872.
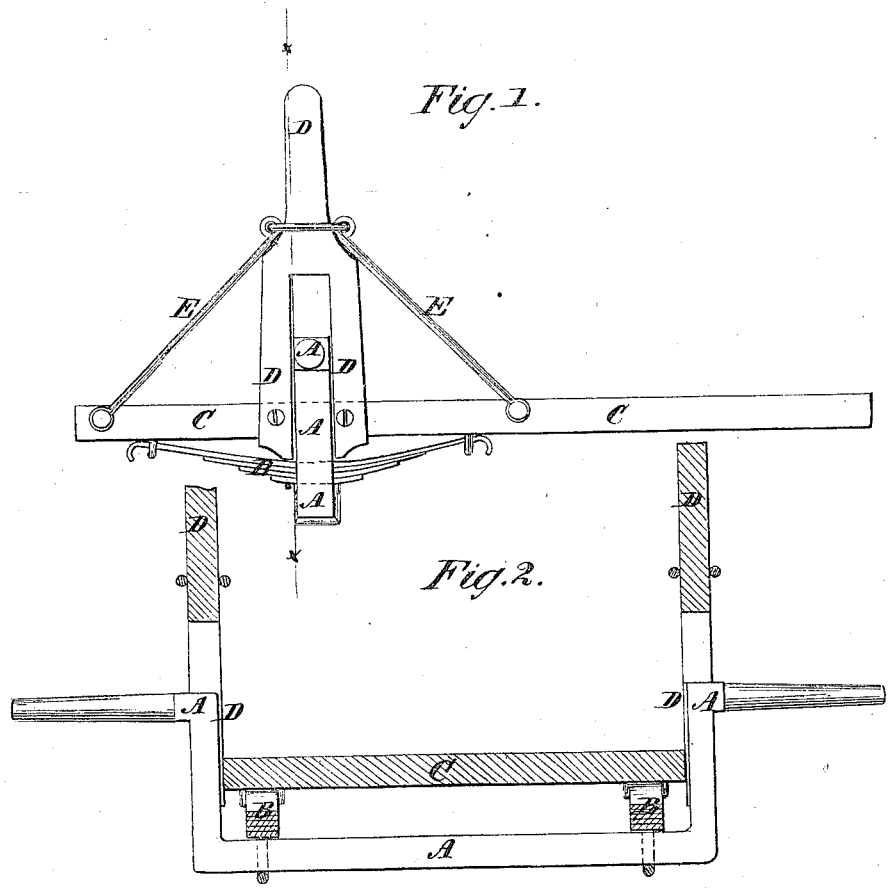
Witnesses:
John Becker
Chuquick
Inventor:
J. N. Stewart
per Munn & Co.
Attorneys.

UNITED STATES PATENT OFFICE.

JOHN N. STEWART, OF BELFAST, MAINE.

IMPROVEMENT IN WAGONS.

Specification forming part of Letters Patent No. 134,445, dated December 31, 1872.

*To all whom it may concern:*

Be it known that I, JOHN N. STEWART, of Belfast, in the county of Waldo and State of Maine, have invented a new and useful Improvement in Carts, of which the following is a specification:

Figure 1 is a side view of a part of a cart illustrating my invention. Fig. 2 is a detail sectional view of the same taken through the line $x\ x$, Fig. 1.

Similar letters of reference indicate corresponding parts.

My invention has for its object to improve the construction of slung-bodied carts, in which the cart-body rests upon springs which rest upon the middle part of a crank-axle, so that the cranks of the axle may be securely supported in position; and it consists in the slotted stakes in combination with the bends or cranks of the axle, and with the cart-body resting upon springs attached to said axle, as hereinafter fully described.

A represents the axle of the cart which is bent twice at right angles near each axle arm or journal, as shown in Fig. 2, so that its middle part that supports the cart-body may be lower than the axes of the wheels, thus allowing large wheels to be used while the cart-body hangs low. B are the springs, which may be made of any desired strength, according to the purpose for which the cart is to be used, and which are secured to the axle A in the ordinary manner. C is the cart-body, which rests upon the springs B, to which it is secured by keepers or other convenient means that will allow the springs B to work freely. To the side edges of the cart-body C, directly above the cranks or bends of the axle A, are securely attached the stakes D, which are made strong, and the lower parts of which are slotted longitudinally to receive the said cranks or bends of the said axle A, and keep the axle in proper position while allowing the cart-body to work up and down freely. The stakes D are strengthened by the braces E, the lower ends of which are secured to the edges of the body C in front and rear of the said stakes D. The upper ends of the braces E are securely connected with the upper parts of the stakes D by a band, bolt, or other substantial means.

By this construction the axle A will be held firmly in position, however much the body C may move up and down upon the springs B.

Having thus described my invention, I claim as new, and desire to secure by Letters Patent—

The slotted stakes D, in combination with the bends or cranks of the axle A, and with the cart-body C resting upon springs B attached to said axle A, substantially as herein shown and described, and for the purpose set forth.

JOHN N. STEWART.

Witnesses:
JOHN F. MORRISON,
GEO. W. DAVIS.